(12) United States Patent
Marathe et al.

(10) Patent No.: US 8,527,990 B1
(45) Date of Patent: Sep. 3, 2013

(54) SYSTEMS AND METHODS FOR MIGRATING VIRTUAL MACHINES

(75) Inventors: Shailesh Vaman Marathe, Maharashtra (IN); Niranjan Pendharkar, NCL (IN); Kedar Patwardhan, Pune (IN)

(73) Assignee: Symantec Corporation, Mountain View, CA (US)

( * ) Notice: Subject to any disclaimer, the term of this patent is extended or adjusted under 35 U.S.C. 154(b) by 189 days.

(21) Appl. No.: 13/097,635

(22) Filed: Apr. 29, 2011

(51) Int. Cl.
*G06F 9/455* (2006.01)

(52) U.S. Cl.
USPC ............................................................. 718/1

(58) Field of Classification Search
None
See application file for complete search history.

(56) References Cited

U.S. PATENT DOCUMENTS

| | | | | |
|---|---|---|---|---|
| 7,032,089 | B1 * | 4/2006 | Ranade et al. | 711/161 |
| 7,900,005 | B2 * | 3/2011 | Kotsovinos et al. | 711/162 |
| 2008/0222375 | A1 * | 9/2008 | Kotsovinos et al. | 711/162 |
| 2009/0113109 | A1 * | 4/2009 | Nelson et al. | 711/6 |

FOREIGN PATENT DOCUMENTS

WO 2004/014952 A2 2/2001

OTHER PUBLICATIONS

Beth Pariseau; VPlex active-active storage creates a stir at EMC World; SearchStorage.com; May 11, 2010; http://searchstorage.techtarget.com/news/article/0,289142,sid5_gci1512092,00.html, as accessed on Nov. 30, 2010.
Subash Rajaa; Systems and Methods for Facilitating Long-Distance Live Migrations of Virtual Machines; U.S. Appl. No. 13/011,841, filed Jan. 21, 2011.
Pariseau, Beth; "VPlex Active-Active Storage Creates a Stir at EMC World"; SearchStorage.com; May 11, 2010.

* cited by examiner

*Primary Examiner* — Emerson Puente
*Assistant Examiner* — Dong Kim
(74) *Attorney, Agent, or Firm* — ALG Intellectual Property, LLC

(57) ABSTRACT

A computer-implemented method for migrating virtual machines may include: 1) identifying a request to migrate a virtual machine from a primary site to a secondary site, the primary site including a primary storage device used by the virtual machine and configured for asynchronous replication to a secondary storage device at the secondary site, 2) identifying a difference map that reflects differences between data on the primary storage device and the secondary storage device, 3) initiating the virtual machine at the secondary site, 4) intercepting an input/output attempt from the virtual machine at the secondary site to the secondary storage device, 5) determining, based on the difference map, that a region of the input/output attempt has not been synchronized from the primary storage device, and 6) retrieving the region from the primary storage device before allowing the input/output attempt to proceed. Various other methods, systems, and computer-readable media are disclosed.

20 Claims, 6 Drawing Sheets

SYSTEMS AND METHODS FOR MIGRATING VIRTUAL MACHINES

BACKGROUND

System administrators may migrate virtual machines from one location to another in order to upgrade hardware, perform system maintenance, manage system resources, or improve virtual machine performance. In some cases, a system administrator may avoid any downtime for a virtual machine by performing a live migration (e.g., keeping the original instance of the virtual machine running until a duplicate instance is ready to take over at an alternate location). For example, the state of the virtual processor and the virtual memory of the virtual machine may be copied to a target hypervisor. Once the target hypervisor is loaded with the virtual machine, the virtual machine may continue to run as before.

However, in order to fully preserve the statefulness of the migrated virtual machine, the virtual machine may also require the same storage view. Ordinarily this may be achieved simply by directing the migrated virtual machine to the same storage device that it used before. Unfortunately, if the target location for a live migration of a virtual machine is a long distance from the original location of the virtual machine (e.g., in a different data center), the original storage device may be too far from the target location of the virtual machine, introducing unacceptable latency. Furthermore, a system administrator may wish to take the original storage device offline as well (e.g., due to an expected outage at the original data center). Accordingly, the instant disclosure addresses a need for additional and improved systems and methods for migrating virtual machines.

SUMMARY

As will be described in greater detail below, the instant disclosure generally relates to systems and methods for migrating virtual machines. Systems and methods described herein may migrate virtual machines by leveraging asynchronous replication data at a secondary site to fulfill input/output requests from an instance of the virtual machine at the secondary site when possible. These systems and methods may determine when asynchronous replication data at the secondary site is suitable for fulfilling input/output requests at the secondary site by using a difference map that identifies differences between data at the primary site and asynchronously replicated data at the secondary site.

For example, a method may include identifying a request to migrate a virtual machine from a primary site to a secondary site. As will be explained in greater detail below, the primary site may include a primary storage device used for storage by the virtual machine. The primary storage device may be configured for asynchronous replication to a secondary storage device at the secondary site. The method may also include identifying a difference map that reflects differences between data on the primary storage device and data on the secondary storage device, initiating the virtual machine at the secondary site, intercepting one or more input/output attempts from the virtual machine at the secondary site to the secondary storage device, determining, based on the difference map, that a region indicated in the input/output attempt has not yet been synchronized from the primary storage device, and then retrieving the region from the primary storage device before allowing the input/output attempt to proceed.

In another example, a system may include one or more processors configured to execute an identification module, an initiation module, an interception module, a determination module, and a retrieval module. The identification module may be programmed to identify a request to migrate a virtual machine from a primary site to a secondary site. The primary site may include a primary storage device used for storage by the virtual machine. The primary storage device may be configured for asynchronous replication to a secondary storage device at the secondary site. The identification module may also be programmed to identify a difference map that reflects differences between data on the primary storage device and data on the secondary storage device. The initiation module may be programmed to initiate the virtual machine at the secondary site. The interception module may be programmed to intercept one or more input/output attempts from the virtual machine at the secondary site to the secondary storage device. The determination module may be programmed to determine, based on the difference map, that a region indicated in the input/output attempt has not yet been synchronized from the primary storage device. The retrieval module may be programmed to retrieve the region from the primary storage device before allowing the input/output attempt to proceed.

The migration identified in the request may include a live migration; e.g., migrating the virtual machine without interrupting any service provided by the virtual machine. In some examples, the initiation module may initiate the virtual machine at the secondary site before the asynchronous replication to the secondary site is complete.

The identification module may identify the difference map in a variety of contexts. In some examples, the identification module may create the difference map. For example, the identification module may determine that output from the virtual machine at the primary site to the primary storage device is quiesced and then create the difference map before initiating the virtual machine at the secondary site. Additionally or alternatively, the identification module may create the difference map based at least in part on a log generated from the asynchronous replication. In some examples, the identification module may initialize the difference map to provisionally reflect a total difference between the data on the primary storage device and the data on the secondary storage device and then update the difference map indicating similarities between the data on the primary storage device and the data on the secondary storage device after initiating the virtual machine at the secondary site.

In some examples, the input/output attempt may include a write attempt. In these examples, the retrieval module may also modify the region with the write attempt before allowing the input/output attempt to proceed. In some examples, the retrieval module may also identify one or more additional input/output attempts from the virtual machine to the secondary storage device and determine, based on the difference map, that a region indicated in the input/output has been synchronized from the primary storage device. In these examples, the retrieval module may then allow the additional input/output attempt to proceed without interruption. In some examples, the input/output attempt may include a read attempt. In these examples, the retrieval modules may retrieve the region from the primary storage device to fulfill to read attempt.

One or more of the systems described herein may also, in some examples, create a point-in-time copy of the data on the secondary storage device before initiating the virtual machine at the secondary site.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
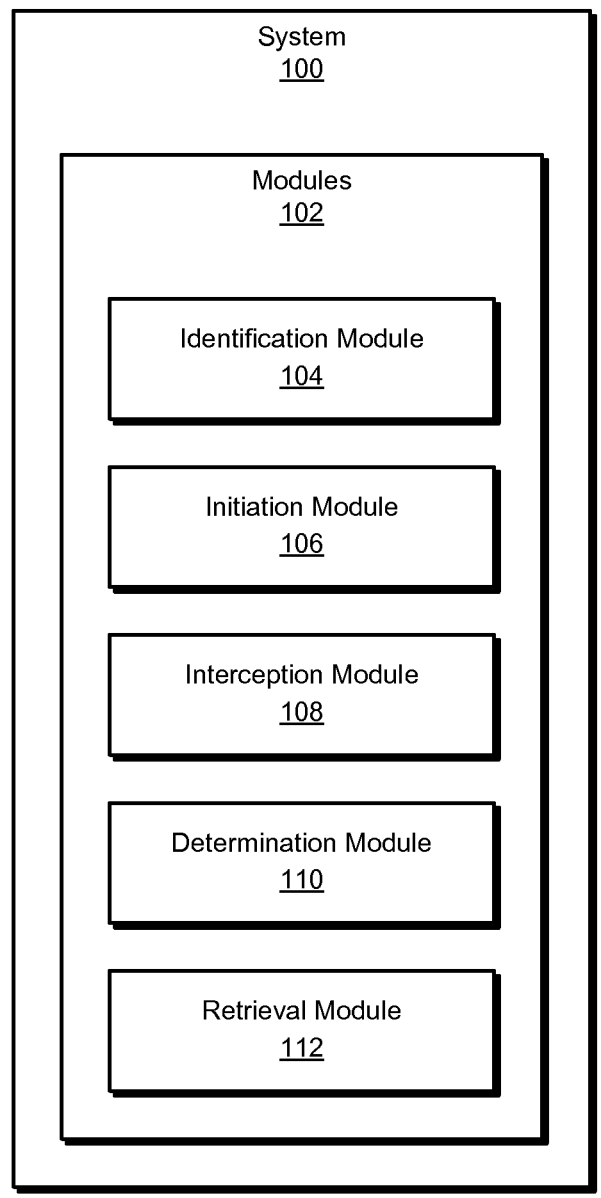
FIG. 1 is a block diagram of an exemplary system for migrating virtual machines.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for migrating virtual machines. Systems and methods described herein may migrate virtual machines by leveraging asynchronous replication data at a secondary site to fulfill input/output requests from an instance of the virtual machine at the secondary site when possible. These systems and methods may determine when asynchronous replication data at the secondary site is suitable for fulfilling input/output requests at the secondary site by using a difference map that identifies differences between data at the primary site and asynchronously replicated data at the secondary site.

By using a difference map to determine whether asynchronous replication data is usable by a migrated virtual machine, these systems and methods may enable system administrators to perform live migration of virtual machines over long distances (e.g., from one data center to another) while minimizing latency for input/output requests and minimizing redundant data transfer from primary to secondary sites. Embodiments of the instant disclosure may also provide various other features and advantages.

Figure 2:
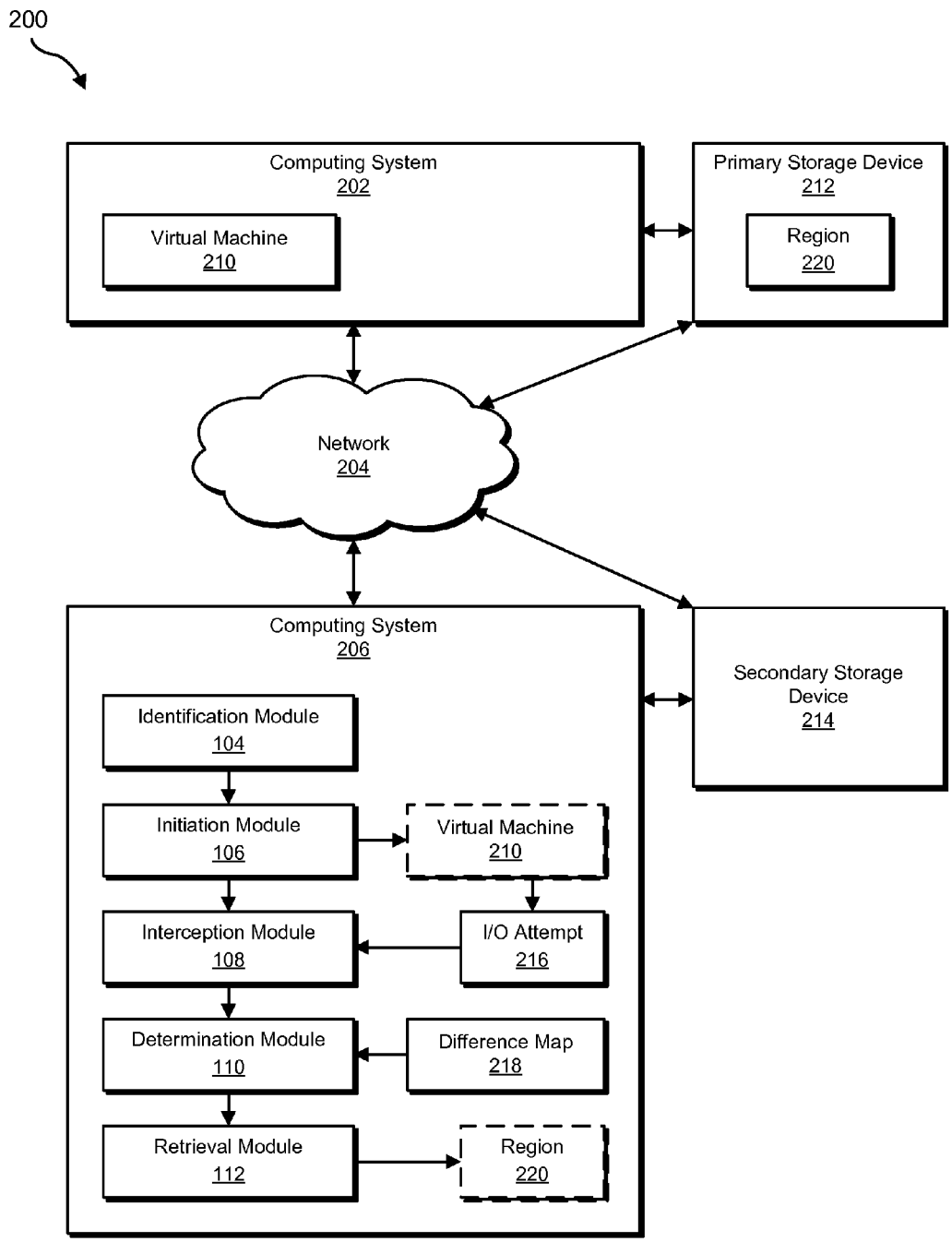
FIG. 2 is a block diagram of an exemplary system for migrating virtual machines.
Figure 3:
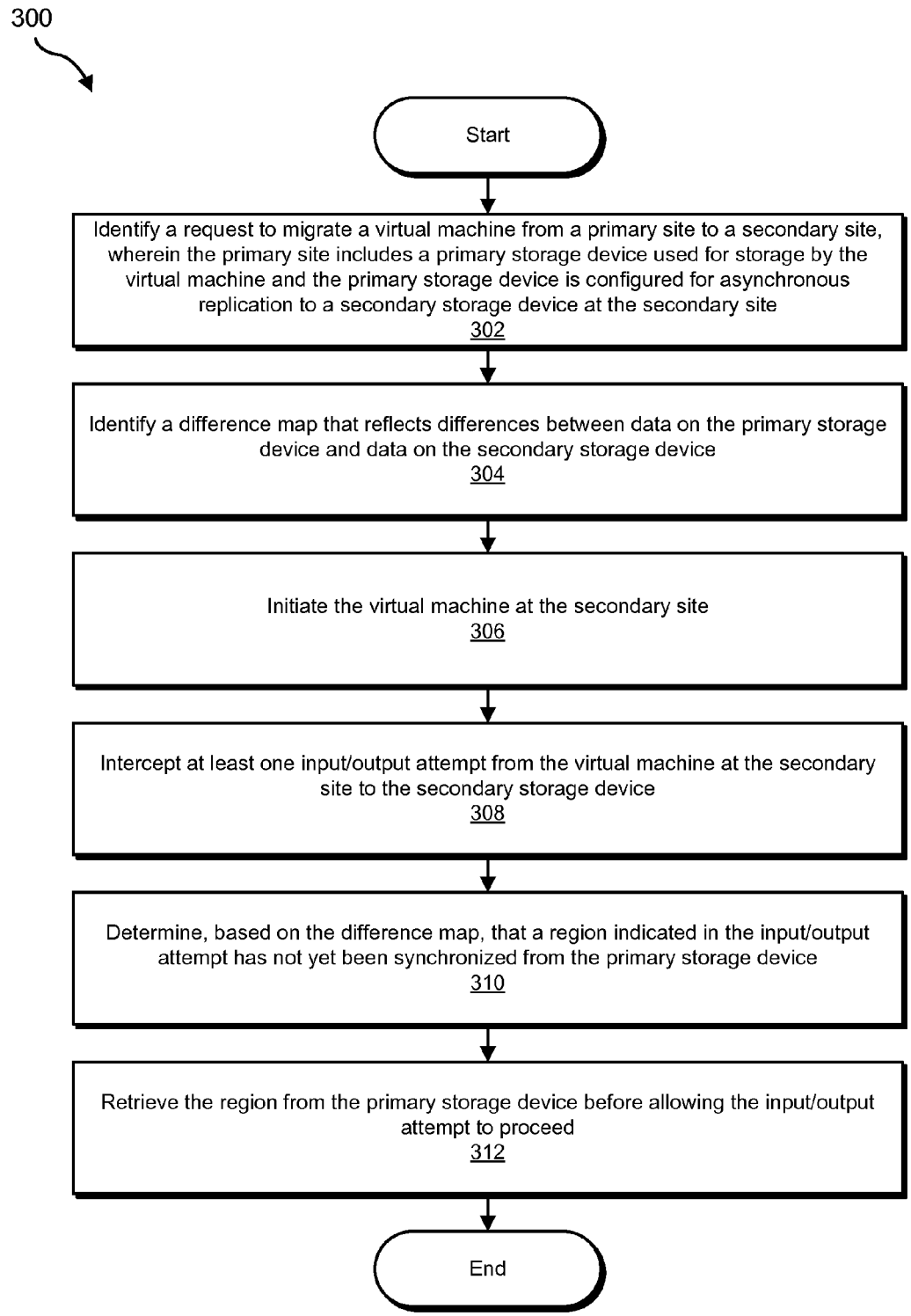
FIG. 3 is a flow diagram of an exemplary method for migrating virtual machines.
Figure 4:
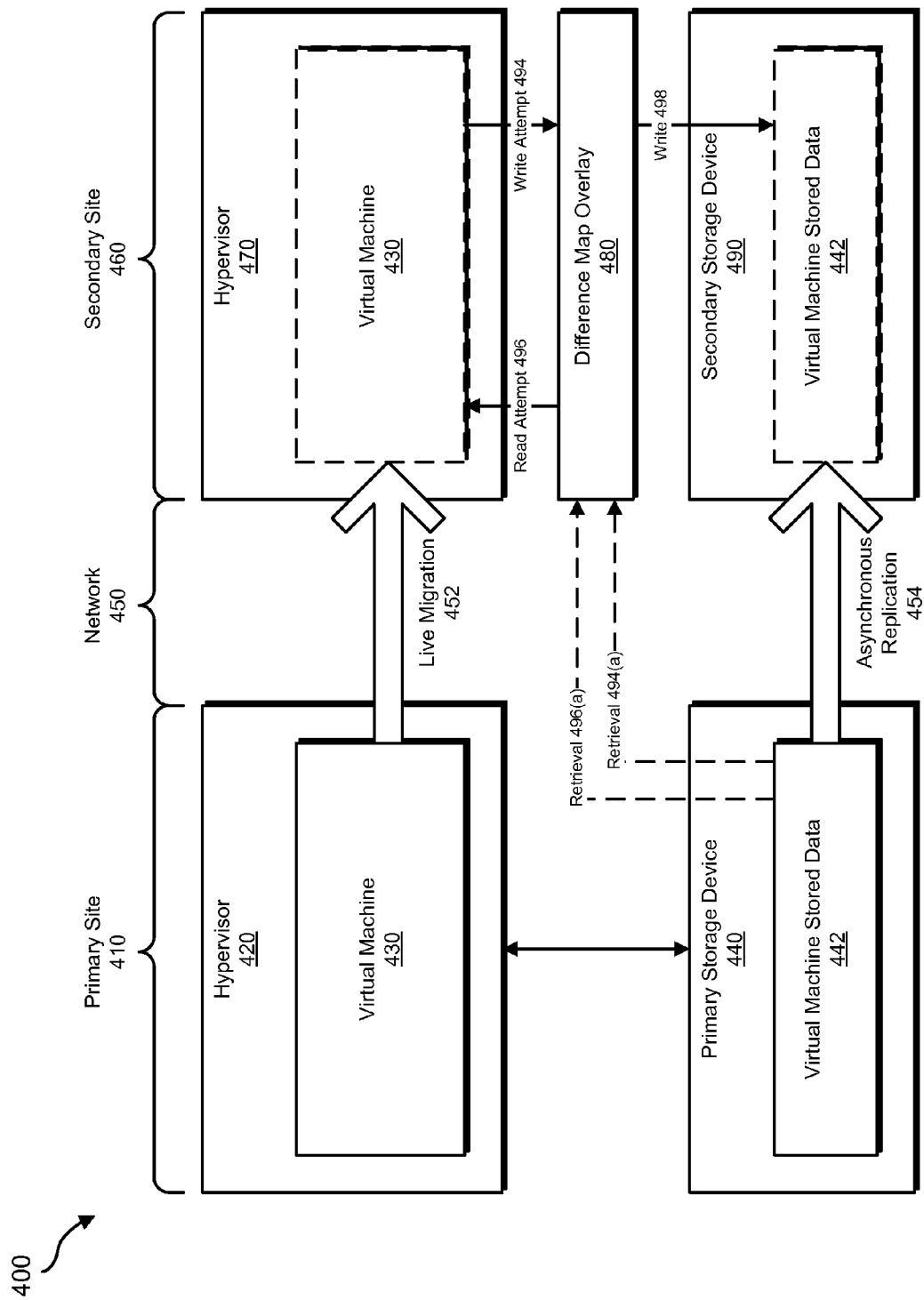
FIG. 4 is a block diagram of an exemplary system for migrating virtual machines.

The following will provide, with reference to FIGS. 1, 2, and 4, detailed descriptions of exemplary systems for migrating virtual machines. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for migrating virtual machines. As illustrated in this figure, exemplary system 100 may include one or more modules 102 for performing one or more tasks. For example, and as will be explained in greater detail below, exemplary system 100 may include an identification module 104 programmed to identify a request to migrate a virtual machine from a primary site to a secondary site. The primary site may include a primary storage device used for storage by the virtual machine. The primary storage device may be configured for asynchronous replication to a secondary storage device at the secondary site. Identification module 104 may also be programmed to identify a difference map that reflects differences between data on the primary storage device and data on the secondary storage device. Exemplary system 100 may also include an initiation module 106 programmed to initiate the virtual machine at the secondary site. Exemplary system 100 may additionally include an interception module 108 programmed to intercept one or more input/output attempts from the virtual machine at the secondary site to the secondary storage device.

In addition, and as will be described in greater detail below, exemplary system 100 may include a determination module 110 programmed to determine, based on the difference map, that a region indicated in the input/output attempt has not yet been synchronized from the primary storage device. Exemplary system 100 may also include a retrieval module 112 programmed to retrieve the region from the primary storage device before allowing the input/output attempt to proceed. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or computing system 206), the devices illustrated in FIG. 4 (e.g., hypervisor 420, hypervisor 470, primary storage device 440, and/or secondary storage device 490), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 hosting a virtual machine 210 in the process of a live migration to computing system 206 over a network 204. In one embodiment, and as will be described in greater detail below, computing system 206 may include identification module 104, initiation module 106, interception module 108, determination module 110, and retrieval module 112.

Identification module 104 may be programmed to migrate a virtual machine 210 from computing system 202 to computing system 206, where primary storage device 212 may be used for storage by virtual machine 210 and primary storage device 212 may be configured for asynchronous replication to secondary storage device 214. Identification module 104 may also be programmed to identify a difference map 218 that reflects differences between data on primary storage device 212 and data on secondary storage device 214 (e.g., due to a lag in asynchronous replication). Initiation module 106 may be programmed to initiate virtual machine 210 on computing system 206. Interception module 108 may be programmed to intercept an I/O attempt 216 from virtual machine 210 on computing system 206 to secondary storage device 214. Determination module 110 may be programmed to determine, based on difference map 218, that a region 220 referred to in I/O attempt 216 has not yet been synchronized from primary storage device 212 (e.g., to secondary storage device 214). Retrieval module 112 may be programmed to retrieve region 220 from primary storage device 212 before allowing I/O attempt 216 to proceed.

Computing system 202 generally represents any type or form of computing device capable of reading computer-executable instructions. Examples of computing system 202 include, without limitation, hypervisors, servers, computing clusters, laptops, desktops, cellular phones, personal digital assistants (PDAs), multimedia players, embedded systems, combinations of one or more of the same, exemplary computing system 510 in FIG. 5, or any other suitable computing device.

Computing system 206 generally represents any type or form of computing device capable of reading computer-executable instructions. Examples of computing system 206 include, without limitation, hypervisors, servers, computing clusters, laptops, desktops, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and computing system 206.

Primary storage device 212 may represent portions of a single storage device or a plurality of storage devices. In some examples, primary storage device 212 may also represent portions of a computing system and/or appliance configured for replicating data. Likewise, secondary storage device 214 may represent portions of a single storage device or a plurality of storage devices. In some examples, secondary storage device 214 may also represent portions of a computing system and/or appliance configured for receiving replicated data.

FIG. 3 is a flow diagram of an exemplary computer-implemented method 300 for migrating virtual machines. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request to migrate a virtual machine from a primary site to a secondary site. The primary site may include a primary storage device used for storage by the virtual machine and the primary storage device may be configured for asynchronous replication to a secondary storage device at the secondary site. For example, at step 302 identification module 104 may, as part of computing system 206 in FIG. 2, identify a request to migrate virtual machine 210 from computing system 202 to computing system 206, where primary storage device 212 may be used for storage by virtual machine 210 and may be configured for asynchronous replication to secondary storage device 214.

The request may include any command, instruction, and/or configuration data indicating that the migration is imminent and/or in process. Accordingly, identification module 104 may identify the request in a variety of ways. For example, identification module 104 may identify the request by receiving a message from a hypervisor, a migration appliance, and/or an application. Additionally or alternatively, identification module 104 may identify the request by identifying a result of the request. For example, identification module 104 may identify the request by identifying the transmission of the virtual machine to the secondary site and/or the installation of the virtual machine at the secondary site.

In some examples, the request may include a request to perform a live migration of the virtual machine. For example, the request may include a request to migrate the virtual machine without interrupting any service provided by the virtual machine. As used herein, the phrase "live migration" may refer to any migration and/or transfer of a virtual machine that minimizes and/or eliminates downtime for the virtual machine. For example, the phrase "live migration" may refer to statefully copying a virtual machine from a primary site to a secondary site and bringing the stateful copy of the virtual machine online (e.g., running and available for transactions) before the original instance of the virtual machine is taken offline. In some examples, the live migration may include copying an execution state (e.g., a virtual processor and the state of the virtual processor) and a memory state (e.g., a virtual random-access memory module and the state of the memory module) from the first site to the second site.

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

As used herein, the term "site" may refer to a geographical location, a network location, and/or a group of computing devices. The phrase "primary site" may refer to a site at which a virtual machine operates before a migration. Additionally or alternatively, "primary site" may refer to a site that includes source data (e.g., stored on a primary storage device) for an asynchronous replication scheme. Likewise, the phrase "secondary site" may refer to a site to which a virtual machine may migrate and/or operate after migration. Additionally or alternatively, "secondary site" may refer to a site that includes a replication target (e.g., a secondary storage device) for an active-passive replication scheme. In some examples, as will be described in greater detail below, the secondary storage device may, if locally mounted at the second site, function as a read-only device during replication.

As used herein, the phrase "asynchronous replication" may refer to any method and/or process of replicating data from a primary storage device to a secondary storage device where the state of replicated data on the secondary storage device does not necessarily reflect the state of data being replicated on the primary storage device. In some examples, "asynchronous replication" may refer to replication wherein a change to data on the primary storage device does not require first ensuring that the change is made to the secondary storage device, potentially resulting in the secondary storage device not reflecting the state of the primary storage device at any given moment. In some examples, the asynchronous replication may be performed on the block level. Additionally or alternatively, the asynchronous replication may be file-level replication. In some examples, the asynchronous replication may be periodic. Generally, the method of asynchronous replication is not restricted to these examples and may be performed in any other suitable manner.

As mentioned above, in some examples identification module 104 may identify the request for the migration by identifying the migration. In some examples, identification module 104 may identify the migration by performing the migration. For example, identification module 104 may copy the virtual machine to the secondary site. Additionally or alternatively, identification module 104 may perform the replication for the data used by the virtual machine from the primary site to the secondary site.

In some examples, identification module 104 may identify the migration as a long-distance migration. For example, identification module 104 may determine that the distance between the primary site and the secondary site exceeds a predetermined threshold (e.g., 200 kilometers). For example, identification module 104 may use IP addresses and/or other geolocation data to determine the locations of the primary and secondary sites and then calculate and/or estimate the distance. Additionally or alternatively, identification module 104 may determine that the data transfer latency between the primary and secondary sites exceeds a predetermined threshold. In some examples, identification module 104 may determine that the distance (e.g., geographical and/or in terms of latency) between the primary site and the secondary site is so great as to require asynchronous replication instead of synchronous replication between the sites. Additionally or alternatively, identification module 104 may simply determine that the primary site is configured to perform asynchronous replication to the secondary site.

FIG. 4 is a block diagram of an exemplary system 400 for migrating virtual machines. As illustrated in FIG. 4, a primary site 410 may include a hypervisor 420 hosting a virtual machine 430. Primary site 410 may also include a primary storage device 440 with virtual machine stored data 442. A live migration 452 may migrate virtual machine 430 (with, e.g., its processor state and memory state intact) to a hypervisor 470 at a secondary site 460 via a network 450. Secondary site 460 may also include a secondary storage device 490. Primary storage device 440 and/or an appliance in communication with primary storage device 440 may be configured to replicate virtual machine stored data 442 to secondary storage device 490, represented as an asynchronous replication 454. In this manner, identification module 104 may identify live migration 452.

Returning to FIG. 3, at step 304 one or more of the systems described herein may identify a difference map that reflects differences between data on the primary storage device and data on the secondary storage device. For example, at step 304 identification module 104 may, as part of computing system 206 in FIG. 2, identify a difference map 218 that reflects differences between data on primary storage device 212 and data on secondary storage device 214. Using FIG. 4 as an additional example, at step 304 identification module 104 may identify a difference map that reflects differences between the state of virtual machine stored data 422 on primary storage device 440 and the state of virtual machine stored data 422 on secondary storage device 490.

The difference map may include any suitable format for reflecting the differences between the virtual machine data at the primary site and the replicated virtual machine data at the secondary site. For example, the difference map may include a bitmap, where each bit represents whether a region of data between the primary and secondary sites is in sync or out of sync. As used herein, the term "region" may refer to any collection of data. Examples of regions may include blocks, sectors, regions and/or chunks of data of heterogeneous sizes. Additionally or alternatively, the difference map may include a collection of object identifiers and offset lengths indicating areas of difference between the primary and secondary sites. Generally, the difference map may include any metadata relating to the virtual machine data capable of differentiating between synchronized data and data that has yet to be synchronized.

Identification module 104 may identify the difference map in a variety of contexts. In some examples, identification module 104 may create the difference map. For example, identification module 104 may first determine that output from the virtual machine at the primary site to the primary storage device is quiesced and then create the difference map before initiating the virtual machine at the secondary site. In this example, identification module 104 may create a difference map that accurately reflects all existing differences between the primary and secondary sites. Identification module 104 may also update the difference map as additional data is synchronized.

In another example, identification module 104 may create the difference map by initializing the difference map to reflect a total difference between the data on the primary storage device and the data on the secondary storage device. For example, identification module 104 may initialize the difference map with all regions of data marked as out of sync between the primary and secondary sites. Identification module 104 may subsequently update the difference map indicating similarities between the data on the primary storage device and the data on the secondary storage device after initiating the virtual machine at the secondary site. For example, identification module 104 may update the difference map in the background with information on regions of virtual machine data that are in sync between the primary and secondary sites. In this manner, identification module 104 may expedite the live migration of the virtual machine by not requiring certain synchronization information at the time the virtual machine is initiated at the secondary site.

Identification module 104 may identify and/or create the difference map using any suitable source data. For example, identification module 104 may create the difference map based at least in part on a log generated from the asynchronous replication. For example, a block-level asynchronous replication system may maintain write-order fidelity with a sequential data log that contains updates that are yet to be replicated to the secondary site. In this example, identification module 104 may scan the sequential data log to determine which blocks of data have yet to be synchronized. Identification module 104 may then create the difference map to represent those regions of data as different between the primary and secondary sites. In another example, a block-level asynchronous replication system performing episodic and/or periodic replication may maintain metadata about changes to data at the primary site over an interval of time (e.g., as an extent list, a bitmap, etc.) In this example, identification module 104 may create the difference map by combining the metadata representing each interval that has not yet been received at the secondary site.

In some examples, the asynchronous replication may occur at the file-level. For example, the asynchronous replication may include a checkpoint-based periodic replication. In this example, identification module 104 may create the difference map by merging the metadata corresponding to each checkpoint that has yet to be replicated to the secondary site. Additionally or alternatively, identification module 104 may create the difference map by scanning a file change log used for the asynchronous replication. In another example, the asynchronous replication may include a file-snapshot-based periodic replication. For example, a snapshot of the data at the primary site may be implemented using a redirect-on-write mechanism (e.g., when a file is changed, create a new extent that stores new data for the files). In this example, identification module 104 may create the difference map based on the extents created for the snapshot which have not yet been sent to the secondary site.

Returning to FIG. 3, at step 306 one or more of the systems described herein may initiate the virtual machine at the secondary site. For example, at step 306 initiation module 106 may, as part of computing system 206 in FIG. 2, initiate virtual machine 210 on computing system 206. Using FIG. 4 as an additional example, at step 306 initiation module 106 may initiate virtual machine 430 on hypervisor 470.

Initiation module 106 may perform step 306 in any suitable manner. For example, initiation module 106 may transmit an instruction to a hypervisor at the secondary site to initiate execution of the virtual machine (e.g., as migrated from the primary site). In some examples, initiation module 106 may initiate the virtual machine before the asynchronous replication is complete. For example, the virtual machine may have been taken offline at the primary site, but a replication system at the primary site may not have completed the process of replicating all data and/or all recent changes to data at the primary site to the secondary site.

At step 308 one or more of the systems described herein may intercept one or more input/output attempts from the virtual machine at the secondary site to the secondary storage device. For example, at step 308 interception module 108 may, as part of computing system 206 in FIG. 2, intercept I/O attempt 216 from virtual machine 210 to secondary storage device 214. Using FIG. 4 as an additional example, at step 308 interception module 108 may intercept write attempt 494 from virtual machine 430 to secondary storage device 490 at the point of a difference map overlay 480. Difference map overlay 480 generally represents any use of a difference map for determining whether to permit read and/or write attempts to pass to virtual machine stored data 442.

Interception module 108 may perform step 308 in a variety of ways. For example, interception module 108 may inject a filter driver on top of the file system used by the virtual machine for the secondary storage device. Interception module 108 may inject the filter driver at any suitable time, such as before the migration. The filter driver may be configured to intercept I/O operations from the virtual machine once the virtual machine is online at the secondary site. As will be described in greater detail below, the filter driver may use the difference map to resolve intercepted I/O operations. Additionally or alternatively, interception module 108 may intercept the input/output attempt as part of a hypervisor and/or as part of any other suitable system.

Using FIG. 4 for an example, interception module 108 may create a difference map overlay 480 between virtual machine 430 and secondary storage device 490 (e.g., by injecting the filter driver described above). Difference map overlay 480 may intercept a write attempt 494 made by virtual machine 430 after the live migration 452 to secondary site 460. Difference map overlay 480 may also intercept a read attempt 496.

Returning to FIG. 3, at step 310 one or more of the systems described herein may determine, based on the difference map, that a region indicated in the input/output attempt has not yet been synchronized from the primary storage device. For example, at step 310 determination module 110 may, as part of computing system 206 in FIG. 2, determine, based on difference map 218, that region 220 corresponding to I/O attempt 216 has not yet been synchronized from the primary storage device. Using FIG. 4 as an additional example, at step 310 determination module 110 may determine, based on the difference map, that the region corresponding to write attempt 494 has not yet been synchronized from primary storage device 440.

Determination module 110 may perform step 310 in any suitable manner, depending on the structure of the difference map. For example, if the difference map includes a bitmap of synchronized regions, determination module 110 may examine a bit in the difference map corresponding to the region to determine that the region has not yet been synchronized from the primary storage device.

At step 312 one or more of the systems described herein may retrieve the region from the primary storage device before allowing the input/output attempt to proceed. For example, at step 312 retrieval module 112 may, as part of computing system 206 in FIG. 2, retrieve region 220 from primary storage device 212 before allowing I/O attempt 216 to proceed. Using FIG. 4 as an additional example, at step 312 retrieval module 112 may determine retrieve the region corresponding to write attempt 494 (e.g., in a retrieval 494(a)) before allowing write attempt 494 to proceed.

Retrieval module 112 may perform step 312 in any suitable manner. For example, retrieval module 112 may simply read the region from the primary storage device. In some examples, retrieval module 112 may also write the region to the secondary storage device (e.g., before allowing the input/output attempt to proceed). Additionally or alternatively, retrieval module 112 may retrieve the region for the direct fulfillment of the input/output attempt and may only write the region to the secondary storage device after and/or as a part of the fulfillment of the input/output attempt. Using FIG. 4 as an example, upon read attempt 496, retrieval module 112 may perform a retrieval 496(a) from primary storage device 440. Retrieval module 112 may then fulfill read attempt 496 directly. Additionally or alternatively, retrieval module 112 may first write the retrieved region to secondary storage device 490 and then allow read attempt 496 to be fulfilled from secondary storage device 490.

In the case that the input/output attempt is a write attempt, retrieval module 112 may modify the region with the write attempt before allowing the input/output attempt to proceed. For example, retrieval module 112 may retrieve the region from the primary storage device, modify the region with the write attempt, and then write the modified region to the secondary storage device. Additionally or alternatively, retrieval module 112 may retrieve the region from the primary storage device, write the region to the secondary storage device, and then allow the write attempt to proceed to the secondary storage device. Using FIG. 4 as an example, upon write attempt 494, retrieval module 112 may perform a retrieval 494(a). Retrieval module 112 may then modified the retrieved region with write attempt 494 and perform a write 498. Additionally or alternatively, retrieval module 112 may write the retrieved region to secondary storage device 490 and then allow write attempt 494 to proceed.

In the case that the input/output attempt is a read attempt, retrieval module 112 may retrieve the region from the primary storage device. In some examples, retrieval module 112 may then fulfill the read attempt with the region. Additionally or alternatively, retrieval module 112 may write the region to the secondary storage device and then allow the read attempt to fetch the region from the storage device. However, even in examples in which retrieval module 112 directly fulfills the read attempt with the region, retrieval module 112 may also update the secondary storage device (and the difference map) with the region.

After retrieving the region and updating the secondary storage device with the region, in some examples retrieval module 112 may update the difference map to reflect that the region has been synchronized at the secondary site. After step 312, method 300 may terminate.

In some examples, one or more of the systems described herein may process an input/output attempt pertaining to a region that has already been synchronized to the secondary site. For example, identification module 104 may identify one or more additional input/output attempts from the virtual machine to the secondary storage device (using, e.g., any of the techniques described earlier). Determination module 110 may determine, based on the difference map, that a region indicated in the input/output attempt has been synchronized from the primary storage device (again, using any of the techniques described earlier). The systems described herein may then allow the additional input/output attempt to proceed without interruption. For example, the additional input/output attempt may operate on the secondary storage device without waiting for a retrieval from the primary storage device.

In some examples, one or more of the systems described herein may create a point-in-time copy of the data on the secondary storage device before initiating the virtual machine at the secondary site. For example, if the primary site lost operational capacity before the migration of the virtual machine was complete, the systems described herein may discard the incompletely synchronized data at the secondary site and restore the point-in-time copy to the secondary storage device to try the migration process again.

By using a difference map to determine whether asynchronous replication data is usable by a migrated virtual machine, these systems and methods may enable system administrators to perform live migration of virtual machines over long distances (e.g., from one data center to another) while minimizing latency for input/output requests and minimizing redundant data transfer from primary to secondary sites.

Figure 5:
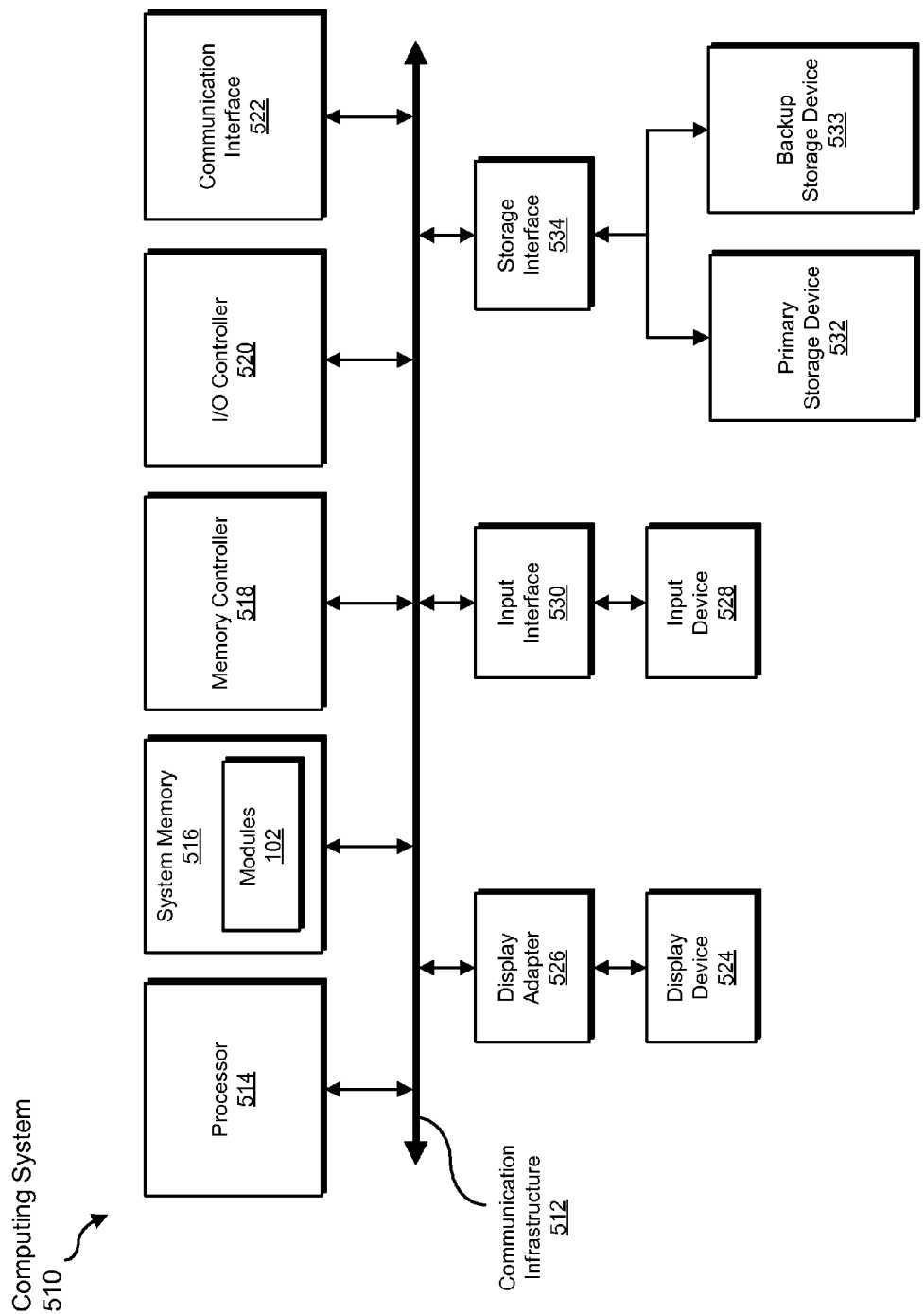
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, performing, determining, creating, initializing, updating, initiating, intercepting, determining, retrieving, and/or modifying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, performing, determining, creating, initializing, updating, initiating, intercepting, determining, retrieving, and/or modifying.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, performing, determining, creating, initializing, updating, initiating, intercepting, determining, retrieving, and/or modifying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, performing, determining, creating, initializing, updating, initiating, intercepting, determining, retrieving, and/or modifying steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, performing, determining, creating, initializing, updating, initiating, intercepting, determining, retrieving, and/or modifying steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, performing, determining, creating, initializing, updating, initiating, intercepting, determining, retrieving, and/or modifying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
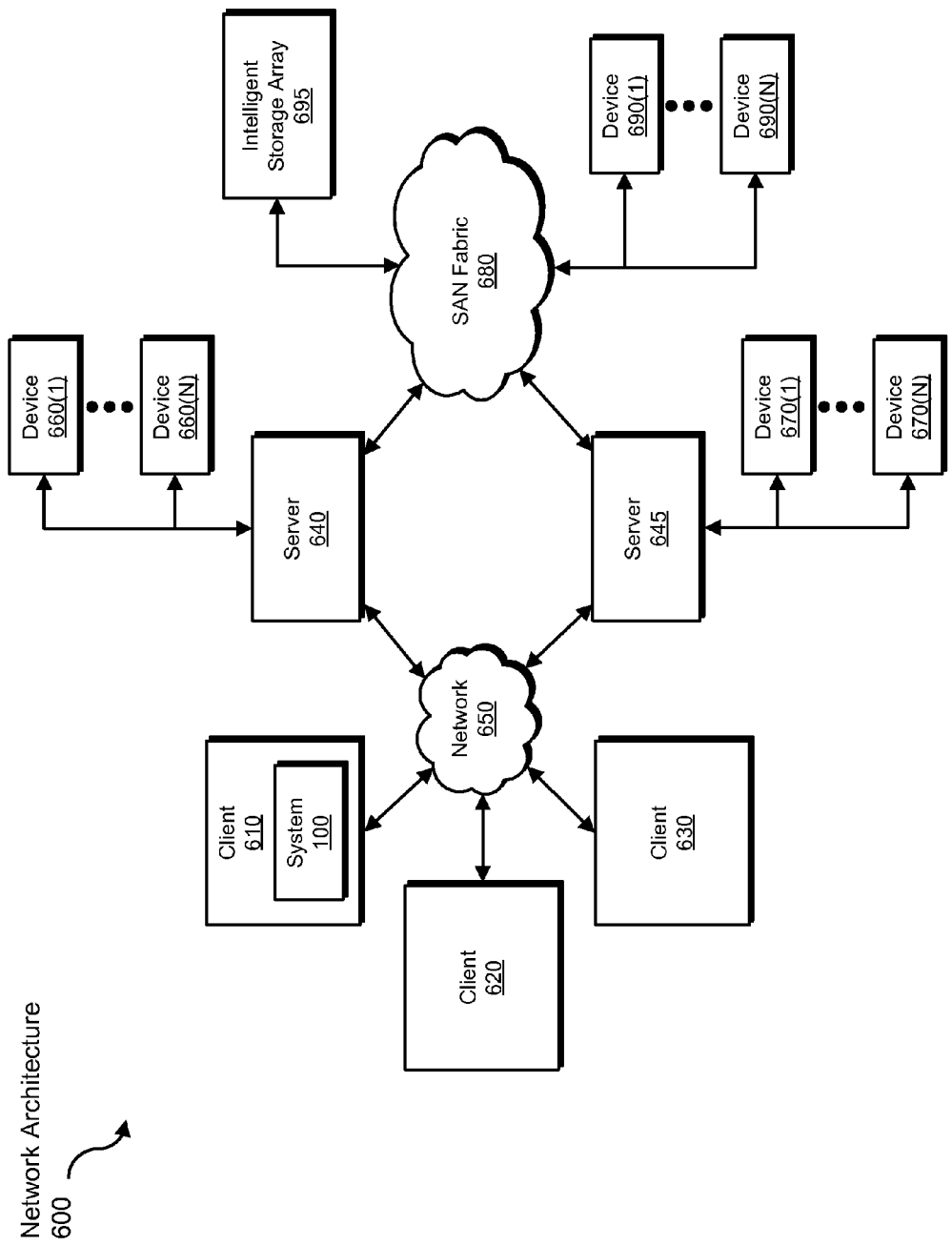
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, performing, determining, creating, initializing, updating, initiating, intercepting, determining, retrieving, and/or modifying steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for migrating virtual machines.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device into a device for efficiently migrating virtual machines.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for migrating virtual machines, at least a portion of the method being performed by a computing device comprising at least one processor, the method comprising:
   identifying a request to migrate a virtual machine from a primary site to a secondary site, wherein:
      the primary site comprises a primary storage device used for storage by the virtual machine;
      the primary storage device has been configured for asynchronous replication to a secondary storage device at the secondary site prior to identifying the request to migrate the virtual machine from the primary site to the secondary site;
   identifying a difference map that:
      reflects differences between data on the primary storage device and asynchronously replicated data on the secondary storage device;
      provides information for use in determining whether the asynchronously replicated data on the secondary storage device can be leveraged to fulfill input/output attempts from the virtual machine at the secondary site that are intercepted after the virtual machine has been initiated at the secondary site;
   initiating, before the primary storage device has been completely replicated to the secondary storage device, the virtual machine at the secondary site;
   intercepting at least one input/output attempt from the virtual machine at the secondary site to the secondary storage device;
   determining, based on the difference map, that a region indicated in the input/output attempt has not yet been synchronized from the primary storage device;
   retrieving the region from the primary storage device before allowing the input/output attempt to proceed.

2. The computer-implemented method of claim 1, wherein identifying the difference map comprises:
   determining that output from the virtual machine at the primary site to the primary storage device is quiesced;
   creating the difference map before initiating the virtual machine at the secondary site.

3. The computer-implemented method of claim 1, wherein identifying the difference map comprises:
   initializing the difference map to reflect a total difference between the data on the primary storage device and the asynchronously replicated data on the secondary storage device;
   updating the difference map indicating similarities between the data on the primary storage device and the asynchronously replicated data on the secondary storage device after initiating the virtual machine at the secondary site.

4. The computer-implemented method of claim 1, wherein:
   at least a portion of the primary storage device has been asynchronously replicated to the secondary storage device at the secondary site prior to identifying the request to migrate the virtual machine from the primary site to the secondary site;
   the difference map provides information for use in determining whether the portion of the primary storage device that has been asynchronously replicated to the secondary storage device is suitable for fulfilling input/output attempts from the virtual machine at the secondary site.

5. The computer-implemented method of claim 1, wherein:
   the input/output attempt comprises a write attempt;
   the computer-implemented method of claim 1 further comprises modifying the region with the write attempt before allowing the input/output attempt to proceed.

6. The computer-implemented method of claim 1, further comprising:
   identifying at least one additional input/output attempt from the virtual machine to the secondary storage device;
   determining, based on the difference map, that a region indicated in the additional input/output attempt has been synchronized from the primary storage device;
   allowing the additional input/output attempt to proceed without interruption.

7. The computer-implemented method of claim 1, further comprising creating a point-in-time copy of the asynchronously replicated data on the secondary storage device before initiating the virtual machine at the secondary site.

8. The computer-implemented method of claim 1, wherein the request to migrate the virtual machine comprises a request to perform a live migration by migrating the virtual machine without interrupting any service provided by the virtual machine.

9. The computer-implemented method of claim 1, wherein identifying the difference map comprises creating the difference map based at least in part on a log generated from the asynchronous replication.

10. The computer-implemented method of claim 1, wherein:
    the input/output attempt comprises a read attempt;
    retrieving the region from the primary storage device before allowing the input/output attempt to proceed comprises retrieving the region from the primary storage device to fulfill the read attempt.

11. A system for migrating virtual machines, the system comprising:
    an identification module programmed to:
       identify a request to migrate a virtual machine from a primary site to a secondary site, wherein:
          the primary site comprises a primary storage device used for storage by the virtual machine;
          the primary storage device has been configured for asynchronous replication to a secondary storage device at the secondary site prior to identifying the request to migrate the virtual machine from the primary site to the secondary site;
       identify a difference map that:
          reflects differences between data on the primary storage device and asynchronously replicated data on the secondary storage device;

provides information for use in determining whether the asynchronously replicated data on the secondary storage device can be leveraged to fulfill input/output attempts from the virtual machine at the secondary site that are intercepted after the virtual machine has been initiated at the secondary site;

an initiation module programmed to initiate, before the primary storage device has been completely replicated to the secondary storage device, the virtual machine at the secondary site;

an interception module programmed to intercept at least one input/output attempt from the virtual machine at the secondary site to the secondary storage device;

a determination module programmed to determine, based on the difference map, that a region indicated in the input/output attempt has not yet been synchronized from the primary storage device;

a retrieval module programmed to retrieve the region from the primary storage device before allowing the input/output attempt to proceed;

at least one processor configured to execute the identification module, the initiation module, the interception module, the determination module, and the retrieval module.

12. The system of claim 11, wherein the identification module is programmed to identify the difference map by:
determining that output from the virtual machine at the primary site to the primary storage device is quiesced;
creating the difference map before initiating the virtual machine at the secondary site.

13. The system of claim 11, wherein the identification module is programmed to identify the difference map by:
initializing the difference map to reflect a total difference between the data on the primary storage device and the asynchronously replicated data on the secondary storage device;
updating the difference map indicating similarities between the data on the primary storage device and the asynchronously replicated data on the secondary storage device after initiating the virtual machine at the secondary site.

14. The system of claim 11, wherein:
at least a portion of the primary storage device has been asynchronously replicated to the secondary storage device at the secondary site prior to identifying the request to migrate the virtual machine from the primary site to the secondary site;
the difference map provides information for use in determining whether the portion of the primary storage device that has been asynchronously replicated to the secondary storage device is suitable for fulfilling input/output attempts from the virtual machine at the secondary site.

15. The system of claim 11, wherein:
the input/output attempt comprises a write attempt;
the retrieval module is further programmed to modify the region with the write attempt before allowing the input/output attempt to proceed.

16. The system of claim 11, wherein:
the interception module is further programmed to identify at least one additional input/output attempt from the virtual machine to the secondary storage device;
the determination module is further programmed to:
determine, based on the difference map, that a region indicated in the additional input/output attempt has been synchronized from the primary storage device;
allow the additional input/output attempt to proceed without interruption.

17. The system of claim 11, further comprising a recovery module programmed to create a point-in-time copy of the asynchronously replicated data on the secondary storage device before initiating the virtual machine at the secondary site.

18. The system of claim 11, wherein the request to migrate the virtual machine comprises a request to perform a live migration by migrating the virtual machine without interrupting any service provided by the virtual machine.

19. The system of claim 11, wherein the identification module is programmed to identify the difference map by creating the difference map based at least in part on a log generated from the asynchronous replication.

20. A non-transitory computer-readable-storage medium comprising one or more computer-executable instructions that, when executed by at least one processor of a computing device, cause the computing device to:
identify a request to migrate a virtual machine from a primary site to a secondary site, wherein:
the primary site comprises a primary storage device used for storage by the virtual machine;
the primary storage device has been configured for asynchronous replication to a secondary storage device at the secondary site prior to identifying the request to migrate the virtual machine from the primary site to the secondary site;
identify a difference map that:
reflects differences between data on the primary storage device and asynchronously replicated data on the secondary storage device;
provides information for use in determining whether the asynchronously replicated data on the secondary storage device can be leveraged to fulfill input/output attempts from the virtual machine at the secondary site that are intercepted after the virtual machine has been initiated at the secondary site;
initiate, before the primary storage device has been completely replicated to the secondary storage device, the virtual machine at the secondary site;
intercept at least one input/output attempt from the virtual machine at the secondary site to the secondary storage device;
determine, based on the difference map, that a region indicated in the input/output attempt has not yet been synchronized from the primary storage device;
retrieve the region from the primary storage device before allowing the input/output attempt to proceed.

* * * * *